United States Patent Office 3,094,507
Patented June 18, 1963

3,094,507
PROCESS FOR PREPARING POLYSILOXANE COMPOSITIONS
Milton Yusem, 5335 S. Harper Ave., Chicago 15, Ill.
No Drawing. Filed Jan. 14, 1960, Ser. No. 2,348
4 Claims. (Cl. 260—46.5)

This invention relates to a process for preparing polysiloxane compositions, and, more specifically, to a fast and economical process which is particularly suitable for preparing silicone oils and gums.

The present application is a continuation-in-part of my copending application, Serial No. 627,992, filed December 13, 1956, now abandoned.

The basic resinous material in the manufacture of silastic rubbers is silicone gum. Present methods for preparing this gum involve the hydrolysis of difunctional silanes to form a silicone fluid composed of polysiloxanes having various linear and cyclic structures. For example, the polysiloxane molecules may consist of straight chains of alternating silicon and oxygen atoms, or these siloxane units may be cyclic structures of various molecular weights. While a number of catalysts have been used to polymerize and equilibrate the silicone material thus obtained, perhaps the most effective from the standpoint of speed, viscosity control and product quality is the catalyst disclosed in the Earl L. Warrick Patent 2,634,252, issued April 7, 1953. However, for use of the Warrick catalyst, it has been considered necessary to eliminate first the linear siloxane component of the hydrolysis product and to treat only the cyclic component in the presence of the catalyst. This fractionation or separation step is undesirable, particularly from the commercial standpoint, because of the time and expense involved and because of the fact that a large portion of the hydrolysis product must first be eliminated or converted in the preparation of the silicone gums.

Therefore, one of the main objects of the present invention is to overcome the aforementioned disadvantages in the preparation of silicone compositions. Another object is to provide a fast method for preparing silicone oils and gums wherein all of the products obtained from the hydrolysis of suitable silanes may be rapidly converted to the desired end product. A further object of the present invention is to provide a method for rendering all of the constituents of an "intermediate" siloxane fluid resulting from both the hydrolysis and condensation of silanes effective in a subsequent equilibration step, and for increasing the proportion of cyclic siloxanes in this intermediate fluid over the concentration of cyclics in the original silane hydrolysate. A still further object is to provide an extremely fast method for condensing low molecular weight linear siloxanes obtained by hydrolyzing difunctional dichlorosilanes to form high molecular weight linear siloxane polymers exceeding 1,000 centistokes in viscosity within a time period of the order of four to sixteen minutes. Other objects will appear as the specification proceeds.

The starting materials for the production of silicone gums and oils are silanes having the general formula $R_nSiX_{4-n}$, where R represents a monovalent hydrocarbon radical, X represents a hydrolyzable group such as a halogen atom, an alkoxy radical, etc., and $n$ is zero, one, two or three. Difunctional silanes, where $n$ is two, are predominantly utilized for gums and linear oils. These silane derivatives or mixtures of such silanes are hydrolyzed to form hydrocarbon-substituted silanols which then condense to produce polysiloxanes of various molecular weights. Normally, a large portion of the product resulting from the hydrolysis of difunctional silanes is composed of linear siloxanes or silanols of alternating silicon and oxygen atoms, while the remainder of the hydrolysis product is generally composed of siloxanes having fully condensed cyclic structures. It should be noted that if the starting material includes tri-functional silanes, some branched-chain siloxanes may also be present in the condensation product. However, since the amount of such tri-functional starting material must be carefully controlled to avoid gelation of the condensation product, the hydrolysis product will be considered, for the purpose of disclosing this invention, to consist predominantly of cyclic and linear siloxanes. As pointed out above, the most effective present methods for the preparation of siloxane compositions require the removal or elimination of the linear silanol or silicol component before proceeding with the alkaline equilibration of that fluid.

While the precise action of the preferred catalyst or catalysts disclosed in the aforementioned Warrick Patent 2,634,252 is not completely understood, it is believed that the failure of the alkali-alcohol catalyst to perform effectively in the presence of low molecular weight silanols arises from the decomposition of the catalyst and the resultant formation of sodium hydroxide, a relatively poor equilibrating agent because of its slow action and the attending formation of cross-linked silicone molecules. Such decomposition does not occur when fully condensed cyclic siloxanes are used because no water of condensation is formed, and, under such conditions, the alkali-alcohol complex or alkali-metal alkoxides of the Warrick patent induce a rapid equilibration resulting in superior benzene-soluble gums characterized by their long linear chains and the absence of cross linkages.

The preference for an alkali-alcohol catalyst in an equilibration reaction may best be understood by further comparing it with the sodium hydroxide catalyst disclosed by Hyde in Patent No. 2,490,357. Sodium hydroxide, even when used for polymerization of "low molecular weight, completely condensed siloxanes," gives rise to a reaction which is not only very slow, but is not even a true equilibration. Instead of an equilibrium distribution of molecular weights depending upon the numerical ratio of end blockers to siloxane units, Hyde obtains a proportionality between siloxane units and sodium atoms which is not in accord with linear equilibration. On the other hand, where equilibration is linear, the expected molecular weight and viscosity of the end product can be calculated from the ratio of siloxane units to alkali atoms, according to the data of J. Barry, Journal of Applied Physics, vol. 17, No. 12, pp. 1020–1024 (1946). Where an alkali-alcohol catalyst is used, such expected viscosities are obtained, signifing true linear equilibration. Furthermore, Hyde teaches that alcohol should be excluded from the reaction, whereas the catalysts of the Warrick Patent No. 2,634,252 are either alcoholates or alcohol complexes.

The advantages of these alcoholates or alcohol complexes disclosed by Warrick are that, unlike the alkali hydroxides which cause undesirable chain branching (loss of linearity), such catalysts produce a linear gum (characterized by benzene solubility) in a relatively short period of time (about one-half hour). However, like Hyde, Warrick teaches catalytic reactions in which the starting silicone material comprises fully condensed cyclics and therefore the cyclic component of the original hydrolysis product is required to be separated from the linear component before equilibration is undertaken.

I have discovered that the separation step may be rendered unnecessary for use of alkali complex equilibration and that all of the products obtained from the hydrolysis of the silanes may be used in the preparation of silicon gums and oils if a quantity of strong sulfuric acid is added to the hydrolysate. It has been found that a strong acid such as 65 percent sulfuric acid not only causes a condensation of the linear silicols far more rapidly than any equilibration, but, in addition, increases the concentration of the cyclic siloxanes. While the reasons for obtaining these results are not completely known, it appears that the combination of high concentration of hydrogen ions and the dehydration action of strong sulfuric acid facilitates rapid condensation. The cyclics present, whether from the original hydrolysate or due to this further condensation, only dissolve and dilute the linear silicol portion. The action of the strong acid then favors intra- rather than inter-molecular condensation of the low molecular weight linear structures in the original hydrolysis product, resulting in still higher cyclic concentrations along with the almost immediate linear growth. Although the dehydrating effect of sulfuric acid may facilitate the rapid reduction of the silanol concentration, it is to be understood that other strong acids such as concentrated hydrochloric acid or the acid oxides of phosphorus can condense silicols.

In connection with the above discovery, it has also been found that the preferred catalysts disclosed in Warrick Patent 2,634,252 are effective as equilibrating agents where only a slight amount of water is present or is evolved during the equilibration process. From theoretical considerations, it appears that any size siloxane should be capable of fast equilibration with the preferred catalysts as long as the dimethyl siloxane unit alone is the point of attack for the alkali-alcohol complex, as it must be for cyclics. However, with low molecular weight silicols, rapid or effective equilibration is not obtained (Example IV), indicating that the low molecular weight silicols are objectionable because the excessive amount of water split out as these silicols condense inactivates the complex. Only by eliminating the excess potential water of condensation from the silane hydrolysis product, such as by using strong sulfuric acid to condense the hydrolysis product to an intermediate fluid, can the advantages of Warricks' catalysts—the speed of equilibration, the excellent properties of the final gums, and the superior silastic rubbers obtained thereby—be obtained through the use of the entire hydrolysis product.

As indicated above, it has been found that while excessive amounts of water disrupt the equilibration process, a slight amount of water tends to promote rather than retard equilibration using the preferred catalysts disclosed in Warrick Patent 2,634,252. Again, the reason for this effect is not definitely known, but, from theoretical considerations, a gain of one molecule of water by the alkali-metal alkoxide would reform the alkali (hydroxide)-alcohol complex; and, conversely, loss of one molecule of water from one molecule of alkali (hydroxide)-alcohol complex would yield the alkali-metal alkoxide. Thus, gain or loss of one molecule of water by the catalyst can function to regenerate either effective form of the alkali catalyst. At the elevated reaction temperatures (100–250° C.) of the equilibration, these reactions are accelerated along with possible loss of water by evaporation. One molecule of water per molecule of complex, due to further silanol condensation, is tolerated, but rapid generation of quantities of water in excess of this one molecule can cause hydrolysis of the alkali-alcohol complex and formation of the undesirable alkali hydroxide catalyst. Since water molecules are split out as linear siloxanes condense, the determination as to whether the water content falls within the tolerance limit depends on the amount of catalysts present (which in turn depends upon the desired viscosity of the end product), the amount of water which may be liberated by silanol condensation, and the possible loss of water by evaporation during the equilibration reaction. For example, a typical gum of 8,000-unit-long siloxane units on an average may be made by equilibration of an intermediate fluid silicone consisting of cyclics (50% by weight) and linear silicols 2,000 units long. For each 8,000-unit-long siloxane formed, there will be loss of only one molecule of water (this corresponds to two molecules of alkali-alcohol complex needed).

While it might be expected that acid concentrations ranging between 10 to 90 percent or more would be effective in the preparation of an intermediate fluid suitable for alkali complex equilibration, it has been found that condensation proceeds most rapidly with strong sulfuric acid of relatively high concentration. For instance, sulfuric acid of a concentration less than about 10 percent appears ineffective as a condensing agent, perhaps because of its poor dehydrating qualities, while an acid concentration of 74 percent or greater results in cleavage of the cyclic structures. The most suitable results with sulfuric acid are obtained by adding enough concentrated acid to reach a preferred acid concentration ranging between 45 percent to 70 percent, approximately, and then vigorously agitating the mixture to insure proper distribution of the reactants. In the event that the reaction between the acid and the water of condensation is such that an exothermic effect is produced, external cooling may be required. As such condensation proceeds very rapidly, the time period being of the order of six to fifteen minutes at room temperature, temperature control may be desirable in order to control the rate of viscosity change. Temperature control is also of value in controlling the effects of endothermal heat of condensation.

As indicated above, the viscosity of the condensing siloxanes increases rapidly in a matter of minutes from an initial viscosity of approximately 5–30 centistokes for the low molecular weight silane hydrolysate to a desired viscosity of over 1,000 centistokes for the high molecular weight condensation product. The precise duration of the acid condensation step depends largely upon the desired viscosity of the resulting material and the method of mixing. Preferably, the reaction should be terminated when the intermediate fluid so formed has reached a viscous but still pourable state having a viscosity in excess of 1,000 centistokes. Sufficient fluidity must be retained so that the acid can be readily separated from the silicone along with any resulting salts due to acid neutralization. It should be noted, however, that the increase of low molecular weight cyclic siloxanes caused by the reaction with strong acid tends to increase the fluidity of this intermediate fluid so that the linear silicols may condense to form chains comprising thousands of units before an intractable viscosity is realized. In the hydrolysis reaction, cyclics may be as high as 60 percent. With suitable hydrolysis conditions, linears may be so low in molecular weight that later treatment with strong sulfuric acid will favor an increase of cyclics. Thus, by choice of conditions, an intermediate fluid may be obtained with cyclics exceeding 80 percent by weight.

As the aim of the condensation step is to eliminate silicols, it is desirable to convert such silicols to cyclics, since a high cyclic content favors low viscosity. For example, if cyclics are 80 percent by weight and linears are 2,000 units long, a satisfactory gum having an average molecular chain length of 10,000 units is theoretically obtainable by equilibration without splitting out water of condensation as the linear silicols polymerize. However, for tractability, an intermediate fluid of even lower viscosity is desirable so that it may be easily poured and washed free of sulfuric acid. This may be achieved by condensing the linear silicols in the intermediate fluid only to the extent that upon subsequent equilibration no more than one molecule of water of condensation is liberated for each molecule of alkoxide catalyst. With linears only 500 units long and 80 percent cyclics, a 7500 unit gum may be achieved by loss of two molecules of water, and, since a 7500-unit molecule has alkali atoms on each end at the termination of equilibration, these two water molecules correspond with two molecules of the alkoxide catalyst. With the same percentage (80%) of cyclics and with linears of 1,000 units long in the intermediate fluid, a 10,000 unit gum may be obtained by equilibration with the concurrent loss of one molecule of water of condensation. Although linear siloxanes 1,000 units long would give a viscosity exceeding 10,000 centistokes, according to Barry, yet when such linears are mixed with only 43 percent cyclics by weight, I have found that the resultant viscosity is below 1,000 centistokes. Thus, in the condensation step, though I achieve linears which by themselves would exhibit viscosities greatly in excess of 10,000 centistokes, yet where 80 percent cyclics are also present, the resultant intermediate silicone fluid shows tractable viscosities in the range of 1,000–2,000 centistokes. In other words, the cyclic component, ranging between 40 to 80 percent of the intermediate fluid, dilutes the linear materials and results in an intermediate fluid of pourable viscosity and even though the linear material comprises molecular chains so large that, in the absence of the cyclics, such material would be intractable or difficult to wash free of sulfuric acid in the absence of solvent.

It is desirable that the intermediate fluid resulting from the strong acid treatment be neutral, clear and dry. To speed up the separation of the acid-water layer from the viscous siloxane fluid, to rid the silicone of acid, and to aid in the washing procedure, sodium bicarbonate or other alkaline agents, and/or a solvent such as xylene, may be added to neutralize the sulfuric acid and break up any emulsions which might otherwise form. In addition, certain mechanical procedures may be employed to mix the neutralizing agent with the acidified fluid and to aid in drying the viscous material and separating the phases. It will be noted that cyclic siloxanes may be present to such a considerable extent that the density of the siloxane layer will be well below that of water, even though linears have been further condensed so that their density now approaches that of water. The final density, appreciably less than one, facilitates separation of the siloxane and the acid-water layers during washing without the need for special solvents, solutions or procedures.

A number of mechanical dispersion devices are available for neutralizing and drying the intermediate fluid, ranging from roller, ball and stone mills to kinetic dispersion devices such as the Kady mill and Dispersator. For intimate and rapid reaction of the material with a solid neutralizing and drying agent, such as calcium oxide, a sand grinding apparatus of the type recently introduced in the paint industry has been found particularly suitable. Such an apparatus comprises a motor-driven stirrer having a central shaft to which numerous steel disks are attached. The acidic intermediate fluid, the material to be dispersed (an excess of calcium oxide), and sand are placed in a suitable container such as a kettle or jacketed drum. Dispersion is accomplished by rapidly rotating the disk-stirrer in this medium to intermix the components and to neutralize and dry the intermediate fluid. Then, subsequently, by filtration alone, an acid-free, dry and clear intermediate fluid may be obtained. Of course, a wide variety of neutralizing and drying agents, alone or in combination, may be used in conjunction with this procedure.

After elimination of the acid and water, the intermediate fluid comprises a mixture of cyclic siloxanes and relatively high molecular weight linear silicones having low silicol concentration. To prepare a silicone gum or oil, this intermediate fluid, consisting of high molecular weight linear silicols and approximately 50–70 percent cyclics, is then equilibrated so that a silicone gum or oil having a predetermined average molecular weight is easily and quickly obtained. This is accomplished by mixing the intermediate fluid with an equilibrating agent capable of cleaving the high molecular weight silicols and the cyclic siloxanes and, at the same time, permitting the growth or reduction of the siloxane molecules to chain lengths of desired size. A number of equilibrating agents are known in the art but, as brought out above, the present invention is concerned with materials capable of being used with the catalysts disclosed in the Earl L. Warrick Patent No. 2,634,252.

During alkali complex or alkoxide equilibration, regulation of the water content (in a low but definite range) may affect dispersion of the complex and the rate of reaction. As previously pointed out, the amount of water (of condensation) may be regulated to provide optimum equilibration conditions.

The amount of alkali-alcohol complex or alkali-metal alkoxide used depends upon the final consistency or viscosity of the silicone oil or gum to be obtained. For instance, if a gum of the desired consistency corresponds to siloxane molecules of 10,000 units in length, then for every 10,000 siloxane units present in the intermediate fluid approximately two molecules of the potassium hydroxide-isopropyl alcohol complex are used. The result will be a silicone having linear siloxane molecules averaging approximately 10,000 units in length. By increasing or decreasing the amount of complex added to the intermediate fluid, the viscosity of the resulting material may be easily varied to produce high molecular weight silicone gums or silicone oils.

After the intermediate fluid has been treated with the alkali-alcohol complex at a temperature of about 160° C. to form a siloxane gum or oil, an equivalent amount of trimethylchlorosilane or other suitable chain terminator may be introduced to eliminate or remove the potassium ions from the siloxane molecules. Such chain terminators replace the potassium atoms and produce end-blocked silicone oils or gums of the desired viscosity and composed only of siloxane units free of inorganic material. The potassium precipitates out of solution as potassium chloride, and this salt may be easily separated by decantation, filtration, or may be washed from the silicone composition.

In the preparation of silicone gums and oils, it is often desirable to include a quantity of material which will permit branching or cross-linking of the molecular structures at some stage in the operation. For purposes of added functionality, a small amount of tri-functional material, such as methyl trichlorosilane, may be added to the silanes before hydrolysis, or a vinyl-containing compound, such as methyl vinyl dichlorosilane, may be similarly added to the starting material, or suitable vinyl-containing siloxanes may be added at the time of equilibration. The addition of relatively small amounts (0.005 to 1.0 percent by weight) of methyl vinyl dichlorosilane at the beginning of the hydrolysis reaction has the advantage of requiring no significant procedural modification from hydrolysis through equilibration, yet the vinyl is available in the gum to aid in the final cure to silastic rubber.

It will be understood, of course, that where a tri-functional material such as methyl trichlorosilane is added to the starting material, a proportionately greater amount of the alkali-alcohol complex is needed during the equilibration step. In order to secure the value of the extra functionality after equilibration, the amount of chain-terminating material may be controlled to leave one or more of the ends or unreacted positions of each branched-chain unit unblocked. The potassium of the unmodified or unblocked branch may then be displaced by an acid to yield a reactive silanol, or other groups, such as ester or ether (which, in turn, may contain unsaturated groups like allyl or vinyl) may be submitted for the unreplaced potassium introduced by the equilibrium complex. Thus, different groups may be substituted for the potassium to vary the characteristics of the final gum and to control the degree and rate of thermosetting.

From the foregoing it is believed evident that the present invention involves a method for quickly and economically preparing silicone gums or oils from silane derivatives wherein the entire product resulting from the hydrolysis of the silanes is used in preparing the desired silicone material. Further advantages of the present invention will become apparent from a consideration of the following illustrative examples.

Example I

The process of the present invention is practiced by first mixing 55 parts of dimethyl dichlorosilane with 1 part vinyl methyl dichlorosilane and then adding this mixture to water (while only 1 mole of water for each mole of dichlorosilane is needed, a large excess of water favors the forward reaction) maintained at 25° C. by a water bath. A hood may be used to exhaust the hydrogen chloride generated by the reaction mixture, and the mixture should be stirred vigorously to insure uniformity and completeness of reaction. The upper silicone layer is then decanted and 65 percent sulfuric acid is added to this hydrolysate.

The addition of sulfuric acid to the decanted hydrolysis product is performed in a three-necked flask equipped with a stirrer and immersed in a cold water bath (about 15° C.). Cold water is preferred here as the addition of 65% sulfuric acid and stirring is otherwise followed by such rapid viscosity increase that the stirred mixture becomes intractable in a few minutes. A crude viscosity device was constructed so as to provide some measure of the rate of condensation or viscosity increase at this stage. This device consisted of ordinary glass tubing with two etched or filed marks on it. Time was taken for the stirred mix, after addition of 65% sulfuric acid, to fall from one mark to the other, after raising the filled tube, open at both ends, just above the level of the mixture. After a short period of time, approximately 6 to 8 minutes, the increase of viscosity was such that flow changed from a rate of less than one second to pass from one mark to the other in the viscosity tube, to a period of several seconds. A rough correlation existed between the time of flow in this tube and the final isolated intermediate silicone. For example, the stirred mixture required a period of 9 seconds to flow between the two marks 4 centimeters apart, using 6 millimeter glass tubing; later, on isolation of the "intermediate silicone," this material was found to have a viscosity of approximately 900 cs.

Immediately after the measured time for flow between marks of the tube reached 9 seconds, toluene and more cold water was added to separate and dilute the silicone product so that further reaction would cease. Vigorous stirring was of help in this mixing procedure. The upper silicone layer could then be transferred to a separatory funnel, washed and neutralized as desired. The resulting product consisted of an intermediate siloxane fluid suitable for alkali complex equilibration.

Immediately following the hydrolysis reaction and before the addition of concentrated sulfuric acid, an aliquot of the hydrolysate was washed free of hydrochloric acid with aqueous sodium bicarbonate, using benzene as a diluent to aid in washing, and then dried. The benzene was then carefully distilled off. Upon analysis, the infrared adsorption pattern for this material revealed a cyclic content of approximately 53%. A similar test upon an aliquot of the dry intermediate fluid showed the cyclic content of that fluid to be about 66%, representing a 24.5% increase in cyclics over those originally present before sulfuric acid condensation.

Example II

The process of Example I may be modified to exclude the use of a solvent such as toluene at the end of the sulfuric acid condensation step. Instead, water alone may be added to the acid-silicone mixture and it has been found that this addition of water alone has the effect of substantially stopping the condensation reaction. Thereafter, the water layer is separated and the silicone is washed several times with aqueous sodium bicarbonate to neutralize the remaining acid. Additional washing with water is undertaken until no acid or alkaline reaction is exhibited by the water washings.

Example III

The entire intermediate siloxane product obtained by the process of Example I may be equilibrated by an alkali-alcohol complex. A suitable complex is prepared by adding 34 gm. of potassium hydroxide to 300 ml. of isopropyl alcohol and refluxing for 3 hours. The solution is then decanted and vacuum distilled to yield the potassium hydroxide-isopropyl alcohol complex composed of substantially equal molar portions of potassium hydroxide and isopropyl alcohol and having the appearance of a whitish powder.

A sample of 370 gm. of the siloxane product of Example I is heated in a 500 ml. round bottomed flask in an oil bath to a temperature of 165° C. and is then mixed with 0.116 gm. of potassium hydroxide-isopropanol complex in the ratio of 2 potassium atoms for every 10,000 siloxane units. After heating the vigorously stirred reactants at 160–165° C. for 25 minutes, the material is then cooled. Toward the end of the 25-minute period, the viscosity becomes so great that stirring is difficult to maintain. The resultant gum is benzene soluble and has a penetrometer reading (in tenths of a mm.) of 195 in 30 seconds at 25° C.

Example IV

A sample of 370 gm. of the hydrolysis product of Example I, having a viscosity of 15 cs., was treated as set forth in Example II without the intermediate step of acid condensation.

The alkali-alcohol complex was prepared as set forth in Example II. A quantity of 0.116 gm. of this complex was then added, with vigorous stirring, to the sample of the hydrolysis product which was previously heated in an oil bath to a temperature of 165° C. After heating the vigorously stirred reactants at 160–165° C. for 2 hours, little viscosity change seemed apparent. Heating and stirring were therefore continued another 3 hours, and the material was then cooled to room temperature.

The resultant viscosity of the fluid obtained was determined to be about 350 cs. by the use of Gardner tubes, the tubes being maintained in a bath at 25° C. Extraction with acetone to remove residual low molecular weight materials caused an increase in this viscosity to about 425 cs.

Example V

The intermediate siloxane product obtained by the process of Example I may be equilibrated by an alkali-alcohol complex prepared as in Example II to produce a silicone oil. A sample of 370 gm. of the siloxane produced in Example I is heated in an oil bath to 165° C. and is then mixed with 2.32 gm. of potassium hydroxide-isopropanol complex in the ratio of 2 potassium atoms for every 500 siloxane units. The reactants are heated at 160–165° C. for approximately 15–20 minutes with vigorous stirring, and the material is then cooled. Using Gardner tubes to estimate viscosity, the oil is found to have a viscosity corresponding with Gardner tube X (approx.) at 25° C.

Example VI

To 136 gm. of water is added 318 gm. dimethyl dichlorosilane as fast as the evolution of hydrogen chloride will permit. A portion of 200 gm. concentrated sulfuric acid is then added (with vigorous stirring and external cooling) to make an aqueous layer about 65% sulfuric acid. Excessive heating and volatilization is prevented by employing an ice water bath until after the acid has been introduced and the endothermic reaction of the silanol condensation offsets the exothermic effect caused by the addition of the acid to the aqueous layer. As in Example I, the reaction mixture is stirred vigorously and the hydrogen chloride gas generated by the mixture is exhausted by a hood.

After reaching a viscosity corresponding to Gardner tube 22 (approximately 3600 cs.), the intermediate fluid is diluted with toluene, separated from the layer of strong sulfuric acid, and then mixed with an aqueous sodium bicarbonate solution in a laboratory dispersator to insure complete neutralization of the residual acid and to reduce the number of mixing and separation steps. The toluene solution of the intermediate fluid is washed several times with water until a neutral reeaction (litmus test) is evidenced. After removal of the toluene by distillation, the product is a viscous but pourable oil composed of linear and cyclic siloxanes. This intermediate silicone fluid is then equilibrated as in Example II with potassium hydroxide-isopropanol complex at 165° C., the potassium-silicone ratio being adjusted to 1 potassium atom for every 100 siloxane units. The final product is an oil having a viscosity of approximately 200 centistokes and having an average chain length of about 200 siloxane units. Infra-red adsorption analysis on samples taken from the dry, neutralized hydrolysate before the addition of the sulfuric acid and from the dry, neutralized intermediate fluid after strong sulfuric acid condensation showed an increase in cyclics from 56% to 72% (approx.), representing an increase of about 29%.

*Example VII*

To eliminate the potassium ions from the silicone oil produced by the alkaline equilibration process set forth in Example II, the oil is reacted with an equivalent amount of trimethylchlorosilane, the number of silane molecules corresponding with the number of potassium ions in the equilibrated fluid. After precipitation of the potassium chloride, thus eliminating the salt from the hot silicone fluid, an oil may be decanted having only siloxane units and no other inorganic material.

*Example VIII*

Dimethyl dichlorosilane is hydrolyzed and treated with 65% sulfuric acid as set forth in Example VI. Instead of a dispersator, however, a combination sand-grinding kinetic dispersion technique is employed to mix and neutralize the reaction product or intermediate fluid. The sand-grinding device is similar to the apparatus currently used for the pigment dispersion of paints and consists of a container and a mechanical stirrer equipped with several disks secured thereto. The container is provided with a water-jacket and cold water is circulated to prevent excessive heating of the intermediate fluid during neutralization.

When the acid-treated hydrolysis product has reached the desired viscosity, stirring is stopped and layers quickly form. The upper layer—the acid-containing intermediate silicone fluid—is then decanted from the strong sulfuric acid solution and is immediately placed in the disk-stirrer mixing device along with a quantity of sand. While the sand-intermediate fluid mixture is vigorously agitated by the rapidly rotating disks, aqueous sodium bicarbonate is introduced as fast as the liberation of carbon dioxide and the heat of neutralization will permit to neutralize the acid quickly and effectively. After filtering out the sand and allowing the silicone and water layers to separate, the upper layer is decanted to secure an acid free silicone fluid.

As a variation of the above sand-grinding technique, a solid agent, such as calcium oxide, may be used instead of the aqueous sodium bicarbonate so that the intermediate fluid is both neutralized and dried at the same time. An excess of solid calcium oxide is added while the sand is being vigorously stirred through the acid-containing intermediate fluid by the rotating disks of the apparatus. The sand and all solids (excess CaO, CaSO$_4$ and suspended Ca[OH]$_2$) are then filtered out, leaving a dry, clear and neutralized intermediate fluid suitable for alkaline equilibration.

*Example IX*

A sample of 1,850 cc. of dimethyl dichlorosilane are reacted with water at 10° C., in a 3 liter, three-necked flask equipped with a dropping funnel, stirrer and reflux condenser. The silane is added slowly beneath the surface of the water and the reactants are stirred vigorously as interaction occurs. The flask is then heated to refluxing temperatures (95–110° C.) and the hydrochloric acid concentration is thereby reduced to approximately 20% (the constant boiling mixture). After refluxing for 3 to 12 hours, depending on the conditions of hydrolysis (temperature in flask, rate of entry of silanes, effectiveness of mixing), an intermediate fluid having an increased viscosity is obtained. This fluid is washed free of acid with aqueous sodium bicarbonate and water until there is no acid or alkaline reaction in the aqueous liquor. After washing and drying, the intermediate fluid is equilibrated as set forth in Example II to produce a polysiloxane gum having linear siloxane molecules of substantially uniform chain length.

*Example X*

The process of Example I may be carried out wherein approximately 0.5 to 0.05 mole percent of methyl trichlorosilane is added to the dichlorosilanes used for hydrolysis. To offset gelation upon the addition of sulfuric acid to the aqueous layer, trimethyl chlorosilane may be added to the reaction mixture, the number of end-blocking monofunctional silane molecules being regulated to exactly equal the number of trichlorosilane molecules in the starting material. The resulting intermediate fluid is then neutralized, washed and separated as in Example I and is equilibrated by the process set out in Example II.

*Example XI*

The process of Example X may be carried out with the amount of trifunctional silane (methyl trichlorosilane) in the starting material ranging between approximately 0.05 and 0.01 mole percent. Since gelation or viscosity difficulties are unlikely because of the relatively small amounts of trifunctional material, the addition of trimethyl chlorosilane is unnecessary during the acid condensation step. During the subsequent equilibration, however, one extra mole of potassium hydroxide-isopropanol complex must be added for each mole of trifunctional silane.

While I have disclosed the method of the present invention in considerable detail for purpose of illustration, it will be understood by those skilled in the art that many of these details may be varied without departing from the spirit and scope of the invention.

I claim:

1. In a relatively fast method for preparing benzene-soluble polysiloxane compositions, the steps of adding dimethyl dichlorosilane to water to form a fluid hydrolysate having a viscosity within the range of about 5 to 30 centistokes and containing both low molecular weight linear and cyclic siloxanes, adding to the entire hydrolysate strong sulfuric acid of a concentration no greater than 72 percent and vigorously agitating the reactants to form an intermediate fluid of increased viscosity composed of both linear and cyclic siloxanes and having an increased proportion of cyclic siloxanes, interrupting the condensation of said linear siloxanes and removing the strong acid and water of condensation from said intermediate fluid when said fluid has reached a viscous but still pourable liquid state so that upon subsequent equilibration no more than one molecule of water is split out for each molecule of the equilibrated fluid, and intimately contacting the intermediate fluid at a reaction temperature within the range of 100 to 250° C. with a catalyst to form an equilibrated silicone composition composed of linear siloxane molecules of predetermined average length, said catalyst being selected from the group consisting of $(ROH)_x \cdot MOH$ and ROM, where R is an alkyl radical of less than 6 carbon atoms, $x$ has a value of 0.5 to 2.5, and M is an alkali-metal selected from the group consisting of sodium and potassium.

2. The process of claim 1 in which the strong sulfuric acid is added to said hydrolysate to form a sulfuric acid concentration within the range of 45 to 72 percent.

3. In a process for preparing an intermediate silicone fluid suitable for equilibration with an alkali-alcohol complex to form benzene-soluble silicones without requiring elimination of linear siloxanes from said fluid before equilibration, the steps of adding dimethyl dichlorosilane to water to form a fluid hydrolysate having a viscosity within the range of about 5 to 30 centistokes and containing both molecular weight linear and cyclic siloxanes, mixing concentrated sulfuric acid with said fluid hydrolysate to condense said linear siloxanes and form an intermediate fluid of increased viscosity composed of both linear and cyclic siloxanes and having an increased proportion of cyclic siloxanes therein, said acid being mixed with said hydrolysate to form a sulfuric acid concentration no greater than 72 percent, and interrupting the condensation of said linear siloxanes and removing the acid and water from said fluid when said fluid has reached a viscous but still pourable liquid state so that upon subsequent equilibration no more than one molecule of water will be liberated for each molecule of the equilibrated fluid, whereby a dry intermediate fluid is provided which is adapted for subsequent equilibration with a catalyst selected from the group consisting of $(ROH)_x \cdot MOH$ and ROM, where R is an alkyl radical of less than 6 carbon atoms, $x$ has a value of 0.5 to 2.5, and M is an alkali-metal selected from the group consisting of sodium and potassium.

4. The process of claim 3 in which said concentrated sulfuric acid is mixed with said fluid hydrolysate to provide a sulfuric acid concentration within the range of 45 to 72 percent.

References Cited in the file of this patent

UNITED STATES PATENTS

| | | |
|---|---|---|
| 2,437,204 | McGregor et al. | Mar. 2, 1948 |
| 2,445,794 | Marsden | July 27, 1948 |
| 2,469,883 | Marsden et al. | May 10, 1949 |
| 2,481,052 | Warrick | Sept. 6, 1949 |
| 2,634,252 | Warrick | Apr. 7, 1953 |

OTHER REFERENCES

Rochow Chemistry of Silicones, 2nd edition, 1951, pub. by John Wiley and Sons, Inc., N.Y. (pages 80–97).

McGregor Silicones and Their Uses, 1954, McGraw-Hill Book Co., Inc., N.Y. (pages 270–276).